(12) United States Patent
Ross (10) Patent No.: US 6,427,631 B1
(45) Date of Patent: Aug. 6, 2002

(54) PET CARRIER

(75) Inventor: Allan G. Ross, Masury, OH (US)

(73) Assignee: Alco Industries, Inc., Valley Forge, PA (US)

( * ) Notice: Subject to any disclaimer, the term of this patent is extended or adjusted under 35 U.S.C. 154(b) by 0 days.

(21) Appl. No.: 09/884,324

(22) Filed: Jun. 19, 2001

Related U.S. Application Data (60) Provisional application No. 60/261,645, filed on Jan. 12, 2001.

(51) Int. Cl.⁷ .................................................. A01K 1/00
(52) U.S. Cl. ....................... 119/496; 119/453; D30/109; D30/114
(58) Field of Search ................................. 119/452, 453, 119/461, 474, 489, 491, 492, 496, 499, 514; 292/36, 41, 57, 33

(56) References Cited

U.S. PATENT DOCUMENTS

| | | | | |
|---|---|---|---|---|
| 4,237,710 A | * | 12/1980 | Cardozo | 292/6 |
| 4,306,432 A | * | 12/1981 | Ravid | 292/34 |
| 4,468,943 A | * | 9/1984 | Beattie et al. | 292/36 |
| D308,429 S | * | 6/1990 | VanSkiver | D30/109 |
| D314,251 S | * | 1/1991 | Van Skiver | D30/109 |
| 4,984,832 A | * | 1/1991 | Canepa | 292/36 |
| 5,778,708 A | * | 7/1998 | Crosby et al. | 109/59 R |
| 6,182,611 B1 | * | 2/2001 | Marchioro | 119/453 |

* cited by examiner

Primary Examiner—Thomas Price
Assistant Examiner—Susan L Piascik
(74) Attorney, Agent, or Firm—Webb Ziesenheim Logsdon Orkin & Hanson, P.C.

(57) ABSTRACT

Disclosed is a pet carrier having a bottom, a top, opposed sides, a first end, a second end, and a door. The first end includes an opening for receiving the door therein. The opening has a plurality of receptacles for receiving ends of bars therein. The door includes a door post having ends insertable into ones of the receptacles. The door also includes a mechanism having a disc and bars. One of the bars is used to cause the disc to rotate which in turn causes the other bars to extend toward the disc or away from the disc to position the mechanism in a latched or unlatched position. Ends of the bars are insertable into ones of the receptacles to secure the door closed.

17 Claims, 8 Drawing Sheets

PET CARRIER

CROSS-REFERENCE TO RELATED APPLICATIONS

This application claims the benefit of U.S. Provisional Patent Application Ser. No. 60/261,645, filed Jan. 12, 2001.

BACKGROUND OF THE INVENTION

1. Field of the Invention

The present invention is directed to a pet carrier, and, more particularly, to a pet carrier for large animals.

2. Description of Related Art

Many pet owners desire to transport their pets from time to time, for example, to take the pet to the veterinarian, to a park, on vacation, or to a new home. Many pet owners do not like their pet to be loose in the vehicle during transport, and, therefore, prefer to contain the pet in a pet carrier during transport. Pet owners also often want a place in the home to contain their pets.

Pet carriers currently come in a variety of shapes, styles, and sizes. Many of the carriers, however, have cumbersome mechanisms to lock the door of the pet carrier. Thus, it is awkward, if not difficult, for the pet owner to place the pet into the pet carrier and secure the pet in there, especially when the pet is of a large variety.

Thus, there is a need for a pet carrier that has a locking mechanism that is easy to manipulate while trying to place the pet into the pet carrier.

BRIEF SUMMARY OF THE INVENTION

It is an object of this invention to provide a pet carrier that has a simple mechanism for locking and unlocking the door.

A pet carrier according to the present invention includes a bottom, a top, opposed sides, a first end, and a second end joining to form a generally rectangular enclosure suitable for housing a pet. The opposed sides, the first end, and the second end are preferably curved.

The first end includes an opening for receiving a door that provides access to an interior of the enclosure. The door is preferably constructed in a grid pattern to provide visual access and ventilation to the interior of the enclosure. The door includes a post and a mechanism. The post extends a height (or length) of the door. Ends of the post are received in receptacles located in the first end. The post provides a pivoting axis for the door to open and close upon.

The mechanism includes a disc and bars. The bars extend across the door and secure the door to the first end in a closed position. The disc enables the bars to move (i.e., retract and extend) to open and close the door. Carrier ends of the bars are received in receptacles located in the first end. Disc ends of the bars are received in the disc. One of the bars is provided with a slide member to facilitate sliding that bar to operate the mechanism. The slide member is moved in a direction to retract the bars from the receptacles. The slide member is moved again to extend the bars into the receptacles. The mechanism is configured to provide easy operation of the door, such that only one hand of the user is necessary to retract the bars and open the door and then close the door and extend the bars.

The bottom of the pet carrier may include a raised portion that defines a trough around the raised portion. Any fluid inside the pet carrier is caught by and held in the trough. A pet inside the pet carrier can, thus, avoid the fluid by positioning itself on the raised surface. Additionally, to a certain degree, the trough prevents fluid from exiting the pet carrier.

The pet carrier may also include wheels attached to the bottom to facilitate transportation of the pet carrier. A leash connector may be provided to which a leash can be attached to facilitate pulling or towing of the pet carrier. A handle may be attached to the pet carrier, preferably to the top. The handle may pivot such that it may be stored in an out-of-the-way position. The pet carrier may also have food and water bowls adapted to connect to the door. The opposed sides and the second end may include vents or a mesh-like area to provide visual access and ventilation to the interior of the enclosure.

The pet carrier may be constructed in two sections. The first section includes the bottom and a portion of the opposed sides, the first end, and the second end. The second section includes the top and remaining portions of the opposed sides, the first end, and the second end. The first section and the second section each include a lip having a plurality of apertures. Fasteners insertable within the apertures are used to secure the first section and the second section together for use. The fasteners include a head, a post, a foot, and a tab. The head and foot enable the fastener to be locked in place, that is, to secure the first section and the second section tightly together. However, in an unlocked position, the tab holds the fastener captive within the aperture.

DETAILED DESCRIPTION OF THE INVENTION

A complete understanding of the invention will be obtained from the following description when taken in connection with the accompanying drawing figures wherein like reference characters identify like parts throughout.

For purposes of the description hereinafter, the terms "upper", "lower", "right", "left", "vertical", "horizontal", "top", "bottom" and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

Referring to FIGS. 1–7, a pet carrier 10 according to the present invention includes a bottom 12, a top 14, opposed sides 16, a first end 18, a second end 20, and a door 22, which together define an enclosure for suitably housing a pet. Preferably, the pet carrier 10 is generally rectangular in shape.

The bottom 12 is preferably substantially rectangular. A center portion 24 of the bottom 12 preferably is raised to form a surface 25 having sloped sides 26. A plurality of wheels 28 may be attached to the bottom 12 to facilitate moving the pet carrier 10, for example, by pulling or towing.

The opposed sides 16 extend from opposed sides of the bottom 12. The first end 18 and the second end 20 extend from opposed ends of the bottom 12. The opposed sides 16, the first end 18, and the second end 20, together with the raised surface 25, the sloped sides 26, and remaining portions of the bottom 12, define a trough surrounding the raised surface 25. Any fluid from the pet or from a pet bowl inside the pet carrier 10 is directed away from the pet and contained in the trough surrounding the raised surface 25.

Preferably, the opposed sides 16, the first end 18, and the second end 20 are curved to form a larger enclosure than could be had with straight sides and to avoid sharp corners created by the junction of straight sides. Additionally, these curves add to the aesthetics of the pet carrier 10. The sides 16 and the second end 20 may include at least one vent or an area of mesh 74 to provide ventilation to an interior of the pet carrier 10.

The first end 18 includes an opening 38 sized and shaped to receive the door 22 therein and a plurality of receptacles 40 positioned around a periphery of the opening 38. The door 22 preferably includes ventilation openings to provide air and visual access into the interior of the enclosure. For example, the door 22 may be constructed of a grid, preferably of steel and plated with chrome or otherwise covered with a suitable material.

Food and water bowls, or other items, may be attached, for example, by hooks integrated into the bowls, to the door 22 and/or mesh areas 74 in the sides 16 or the second end 20.

The pet carrier 10 may further include a leash connector 30 to which a leash may be attached to facilitate transportation of the pet carrier 10, for example, by pulling or towing. Preferably, the leash connector 30 includes a pair of fins 32, each of which includes a leash pin hole 34 to receive a leash pin (not shown). The leash pin is inserted into the leash pin holes 34 in the fins 32. In use, a leash may be attached to the leash pin of the leash connector 30 to aid in the transport of the pet carrier 10. The leash connector 30 may be positioned on the top 14, the second end 20, or, preferably, the first end 18.

The door 22 includes a door post 42 and a mechanism 44. Both ends of the door post 42 are received into ones of the plurality of receptacles 40 around the periphery of the opening 38 to provide pivoting movement of the door 22 around the door post 42 for opening and closing the door 22.

Figure 1:
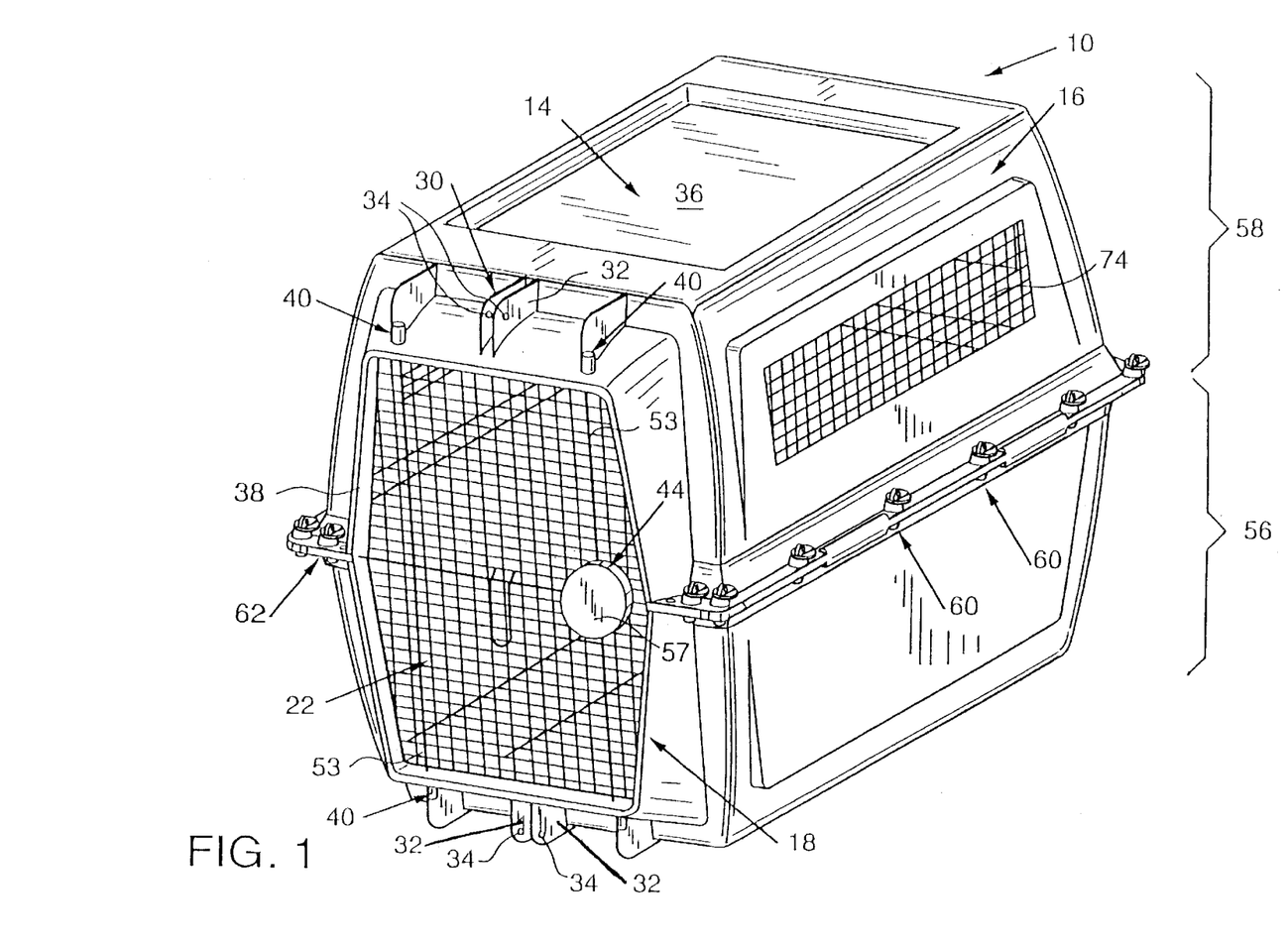
FIG. 1 is a perspective view of a pet carrier according to the present invention.
Figure 2:
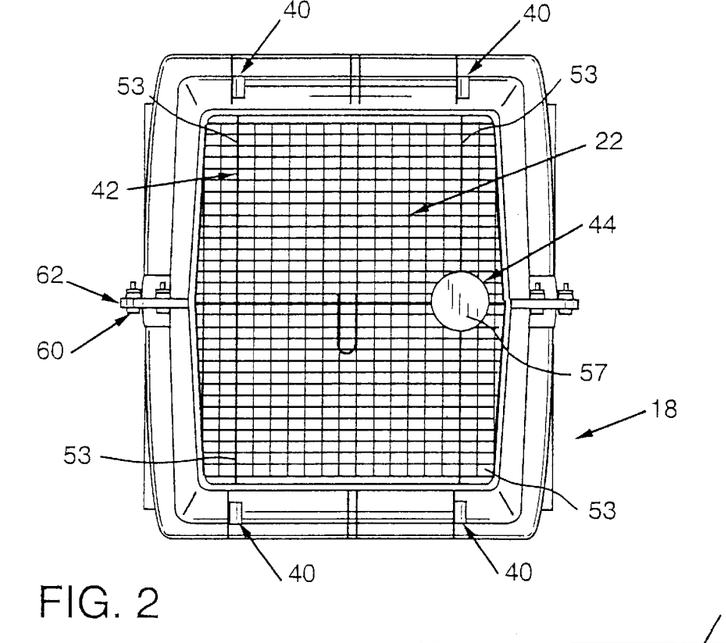
FIG. 2 is a front view of the pet carrier shown in FIG. 1.
Figure 3:
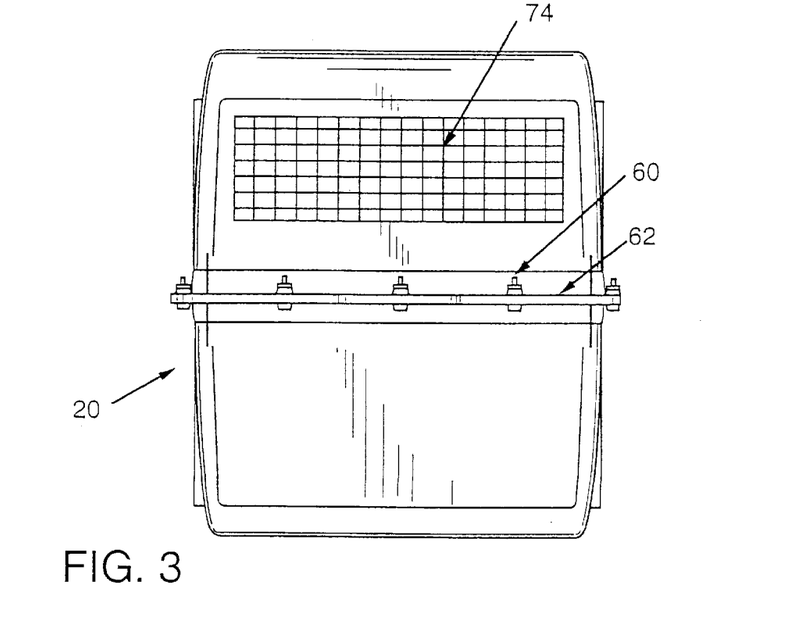
FIG. 3 is a rear view of the pet carrier shown in FIG. 1.
Figure 4:
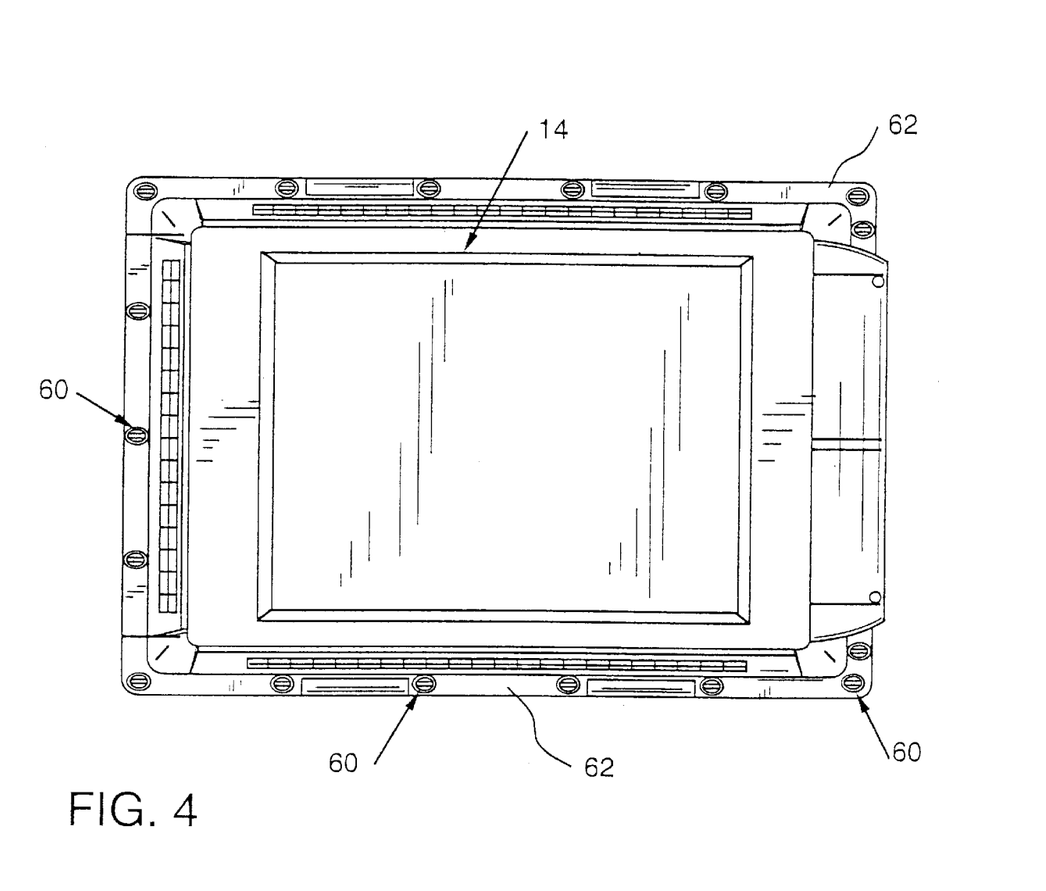
FIG. 4 is a top view of the pet carrier shown in FIG. 1.
Figure 5:
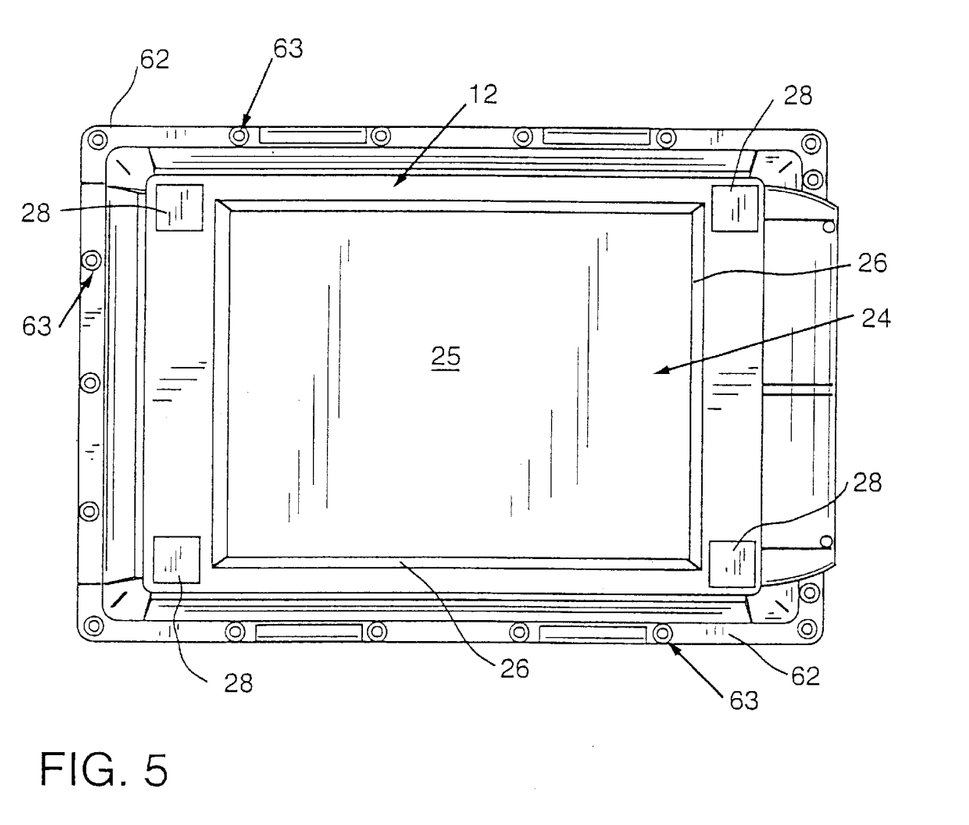
FIG. 5 is a bottom view of the pet carrier shown in FIG. 1.
Figure 6:
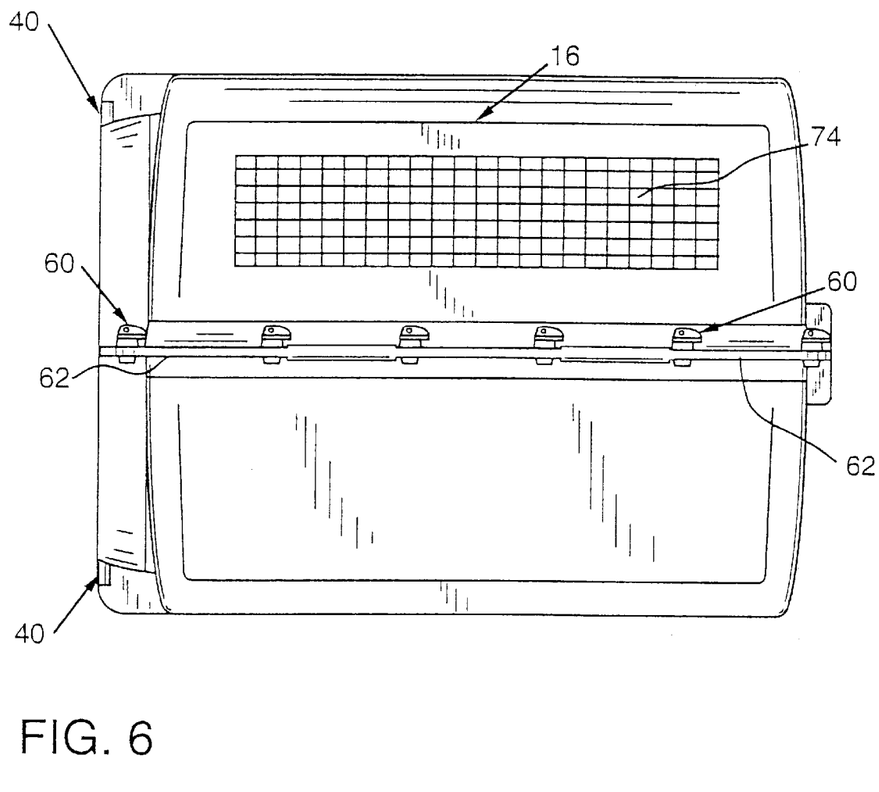
FIG. 6 is a side view of the pet carrier shown in FIG. 1.
Figure 7:
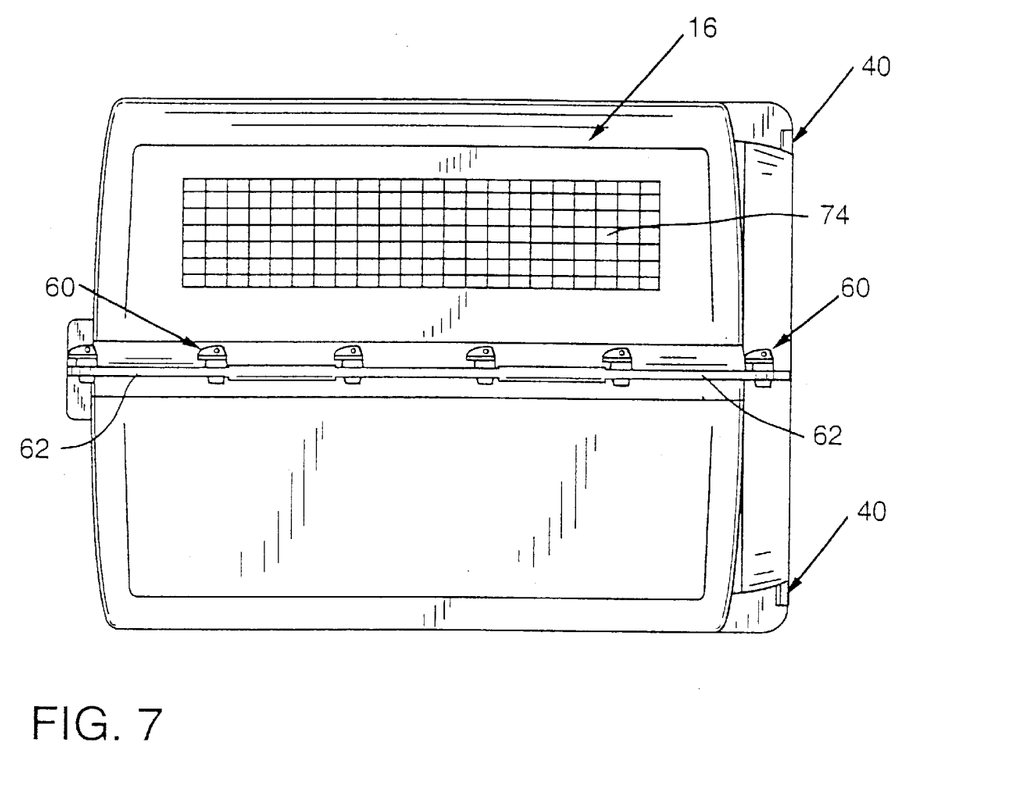
FIG. 7 is another side view of the pet carrier shown in FIG. 1.
Figure 8:
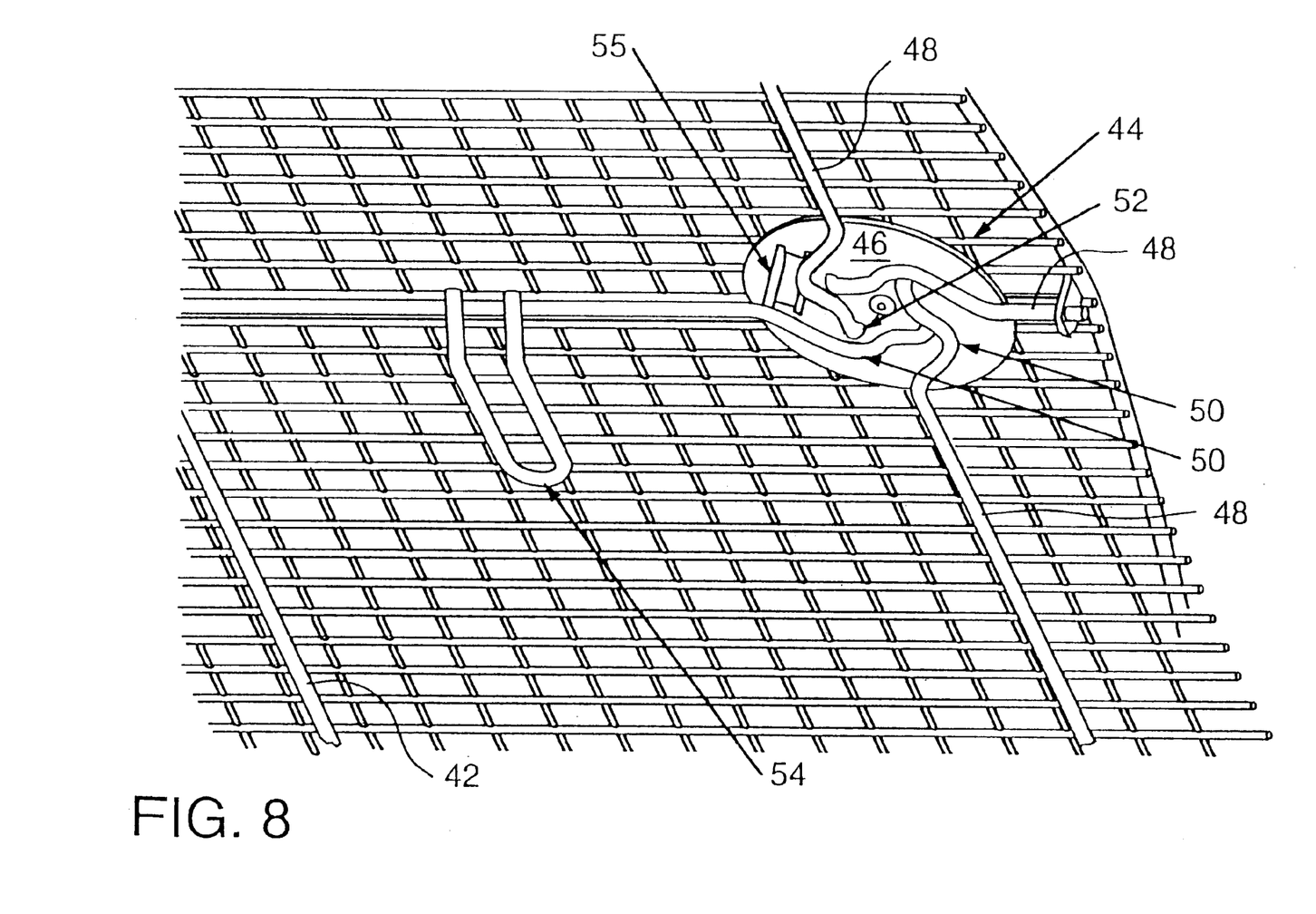
FIG. 8 is a perspective view of a mechanism without a cover on a door of the pet carrier shown in FIG. 1.
Figure 9A:
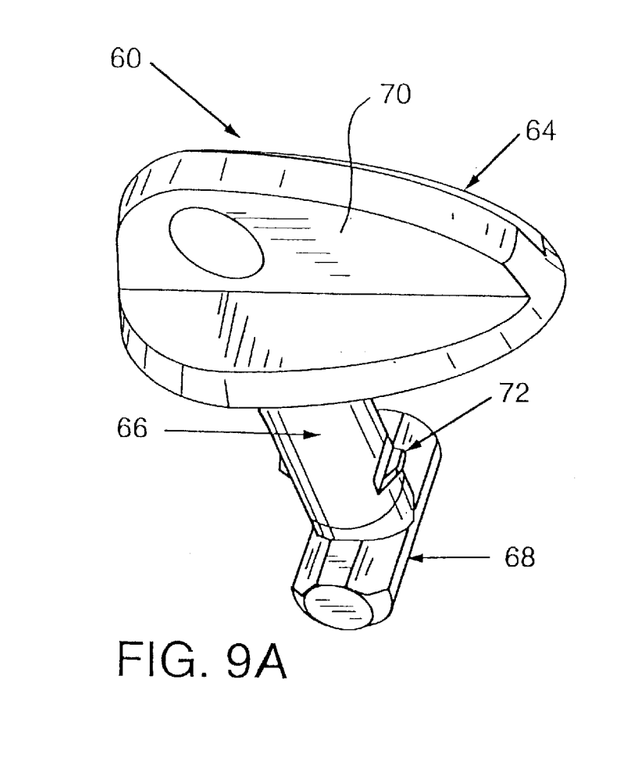
FIG. 9A is a perspective view of a fastener of the pet carrier shown in FIG. 1.
Figure 9B:
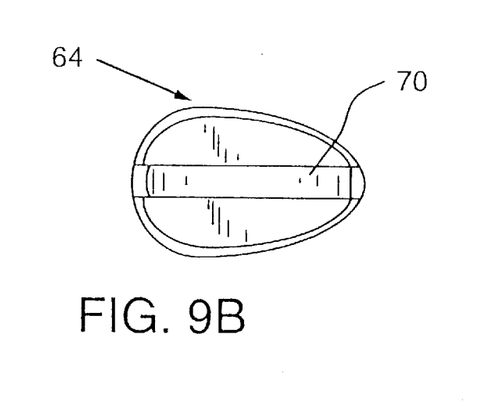
FIG. 9B is a top view of the fastener shown in FIG. 9A.
Figure 9C:
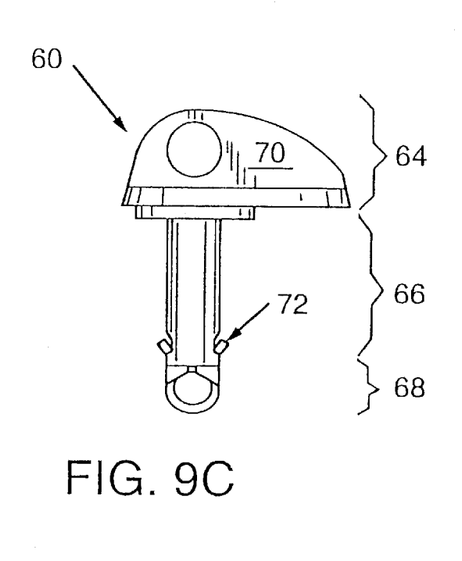
FIG. 9C is a side view of the fastener shown in FIG. 9A.
Figure 9D:
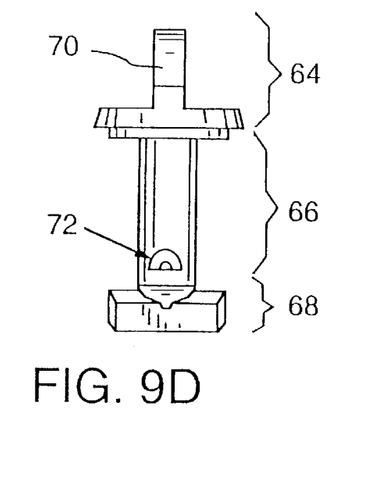
FIG. 9D is an end view of the fastener shown in FIG. 9A.

Referring to FIG. 8, the mechanism 44 includes a disc 46 and a plurality of bars 48, preferably four bars 48. The disc 46 is rotatably mounted to the door 22 and includes a plurality of openings, one opening for each of the plurality of bars 48. Each bar 48 extends along a longitudinal axis. A V-shaped bend 50 is defined near a disc end 52 of each bar 48. The disc end 52 of each bar 48 is bent at an angle to the longitudinal axis of the bar 48. The disc end 52 of each bar 48 is inserted into one of the openings of the disc 46 such that the bars 48 extend away from the disc 46. One of the bars 48 has a member 54 fixedly attached to it to facilitate the pet owner in sliding the bar 48.

In the preferred four-bar construction, the bars 48 are at approximately 90 degree angles to each other. Two of the four bars 48 extend towards the opposed sides 16 of the pet carrier. The other two bars 48 extend towards the top 14 and bottom 12 of the pet carrier 10.

In an unlatched position, the four bars 48 form a rectangular shape near a center of the disc 46 with each V-shaped bend 50 forming a corner of the shape by surrounding one opening in the disc 46 where another bar 48 has its disc end 52 inserted. In this position, the door 22 is free to pivot about the door post 42.

In order to move the mechanism 44 to a latched position, the member 54 is used to slide the attached bar 48 away from the disc 46. The disc end 52 of the bar 48, which is inserted into one of the openings of the disc 46, exerts a force on the disc 46 and causes the disc 46 to rotate. The rotation of the disc 46 causes the other disc ends 52 to rotate in the direction of the disc 46 rotation, which in turn causes the other bars 48 to move and begin to extend away from the disc 46. When the bar 48 attached to the member 54 cannot be slid any further, the other bars 48 are fully extended and the mechanism 44 is in the latched position. To return the mechanism 44 to the unlatched position, the member 54 is used again to slide the attached bar 48 toward the disc 46 until the other bars 48 are fully retracted and in the unlatched position.

These movements may be used to secure the door 22 closed. When the mechanism 44 is in the unlatched position, the door 22 is pivoted to be received within the opening 38. The mechanism 44 is then moved to the latched position. In the latched position, carrier ends 53 of the bars 48 extend beyond the door 22 and are received in ones of the receptacles 40 around the opening 38. The door 22 is secured in three locations by the carrier ends 53 of the three bars 48 being inserted in the receptacles 40. To open the door 22, the mechanism 44 is moved to the unlatched position and the door 22 is free again to pivot about the door post 42.

The door 22 may include a plurality of stops (not shown). The disc 46 may include at least one detent 55 that engages one of the plurality of stops in the door 22 to hold the disc 46 in a desired location. This helps maintain the mechanism 44 in the latched or unlatched position. To begin rotation of the disc 46, a predetermined amount of force must be applied to the member 54 before the detent 55 will disengage the stop.

Alternatively, the mechanism 44 may be biased such that when at rest, the mechanism 44 is in the latched position. In this configuration, the pet owner need only slide the member 54 toward the disc 46 to operate the mechanism 44; the biasing will return the bars 48 to their original, latched position. When the pet owner wants to close an open door 22, the member 54 is slid to retract the bars 48 in order to be able to shut the door 22. Once the door 22 is shut, the member 54 is released and the mechanism 44 returns to the latched position. A spring may be used to bias the mechanism 44. This configuration makes the pet carrier 10 easier to use, especially while handling a pet.

Referring again to FIGS. 1–7, a cover 57 may be attached to the disc 46 to enclose the disc 46, the disc ends 52 of the bars 48, and the V-shaped bends 50 for aesthetic and safety purposes.

The top 14 is connected to the opposed sides 16, the first end 18, and the second end 20. A handle (not shown) may be provided on the top 14 to facilitate the transportation of the pet carrier 10. Preferably, the handle pivots such that the handle may lie against the top 14 when not needed. Preferably, the top 14 is substantially the mirror image of the bottom. The raised surface 25, in this manner, defines a recess 36. The pivotable handle may be located in the recess 36 so that the handle may be stored out of the way to prevent injury or contact with other items when not in use.

Preferably, the top 14, the bottom 12, the sides 16, the first end 18, and the second end 20 are constructed of plastic. Preferably, the door 22 and any mesh areas 74 are constructed of steel. Preferably, the steel is plated with chrome or otherwise covered with a suitable material.

In a preferred embodiment, the pet carrier 10 may be split horizontally into a first section 56 and a second section 58 connected by a plurality of fasteners 60. The first section 56 includes the bottom 12 and a portion of each of the sides 16, the first end 18, and the second end 20. The second section 58 includes the top 14 and a remainder of the sides 16, the first end 18, and the second end 20. The opening 38 may also be split between the first section 56 and the second section 58. A lip 62 extends on the first section 56 and the second section 58 where the first section 56 and the second section 58 meet to be fastened together. A plurality of apertures 63 (see FIG. 5) is located on each lip 62 and is configured to receive the plurality of fasteners 60 therein. The plurality of fasteners 60 is inserted within the plurality of apertures 63 to secure the first section 56 to the second section 58.

Referring to FIGS. 9A–9D, each of the plurality of fasteners 60 includes a head 64, a post 66, and a foot 68. A width or diameter of the head 64 is larger than a width or diameter of each of the plurality of apertures 63. The head 64 may include a fin 70 to facilitate twisting of the fastener 60. The foot 68 and post 66 are insertable into one of the plurality of apertures 63. A width of the foot 68 is larger than the width of the aperture 63 such that the foot 68 may be inserted in one direction only. One fastener 60 is inserted into each of the plurality of apertures 63, foot 68 first, then post 66, until the head 64 rests on the lip 62 of the corresponding sections 56, 58. The fastener 60 is then twisted until the foot 68 cannot be withdrawn through the aperture 63, securing the first section 56 to the second section 58 at that fastener 60.

Preferably, each aperture 63 in either the first section 56 or the second section 58 includes a slot (not shown). The post 66 includes at least one flexible tab 72 extending from the post 66 at an angle towards the head 64. The tab 72 is insertable within the slot in an aperture 63. When the post 66 is inserted into the aperture 63, the tab 72 folds against the post 66 until the tab 72 engages the slot in the aperture 63, at which time the tab 72 extends to its original position. Since the tab 72 is at an angle to the post 66, and is now within the slot, the tab 72 frictionally retains the post 66 within the aperture 63. The tab 72 allows the fastener 60 to remain connected to the first section 56 or second section 58 even when the foot 68 is rotated to be in position to be withdrawn from the aperture 63 (i.e., the fastener 60 is held captive in the aperture 63).

It will be understood by those skilled in the art that while the foregoing description sets forth in detail preferred embodiments of the present invention, modifications, additions, and changes might be made thereto without departing from the spirit and scope of the invention.

I claim:

1. A pet carrier, comprising:
   a bottom;
   opposed sides extending from the bottom;
   a first end extending from the bottom and the opposed sides and including an opening having a plurality of receptacles positioned around a periphery of the opening;
   a second end opposed to the first end and extending from the bottom and the opposed sides;
   a top connected to the opposed sides, the first end, and the second end defining an enclosure; and
   a door receivable within the opening, the door including a door post having a pair of ends, each end receivable within one of the receptacles and a mechanism having a rotatable disc and a plurality of bars, each of the plurality of bars having a carrier end receivable within one of the plurality of receptacles and a disc end receivable within the disc, wherein when the disc is rotated, the carrier ends of the plurality of bars either extend toward the plurality of receptacles or retract from the plurality of receptacles.

2. The pet carrier according to claim 1, wherein the bottom includes a raised center portion forming a surface having sloped sides.

3. The pet carrier according to claim 1, further including a plurality of wheels attached to the bottom.

4. The pet carrier according to claim 1, wherein the opposed ends, the first end, and the second end are curved.

5. The pet carrier according to claim 1, wherein the opposed sides include at least one vent.

6. The pet carrier according to claim 5, wherein the vent is constructed of a mesh material.

7. The pet carrier according to claim 6, wherein the mesh material is steel.

8. The pet carrier according to claim 1, wherein the door has ventilation openings.

9. The pet carrier according to claim 1, further including at least one bowl attachable to the door.

10. The pet carrier according to claim 1, further including a leash connector.

11. The pet carrier according to claim 1, wherein the mechanism further includes a cover.

12. The pet carrier according to claim 1, further including a handle connected to the top.

13. The pet carrier according to claim 12, wherein the handle is pivotable.

14. The pet carrier according to claim 13, wherein the top further includes a recess, and the handle is connected to the recess such that when the handle is pivoted to be parallel with the top, the handle lies within the recess.

15. The pet carrier according to claim 1, wherein:
   the bottom, the top, the opposed sides, the first end, and the second end are made of plastic, and the door is constructed of steel.

16. The pet carrier according to claim 1, further including:
   a first section including the bottom, a portion each of the opposed sides, the first end, and the second end, and a lip having a plurality of apertures;
   a second section including the top, remaining portions of the opposed sides, the first end, and the second end, and a lip having a plurality of apertures; and
   a plurality of fasteners, each of the plurality of fasteners insertable into one of the plurality of apertures.

17. The pet carrier according to claim 16, wherein:
   each of the plurality of apertures has a slot,
   each of the plurality of fasteners has a head, a post, and a foot, the post includes a tab,
   the foot and post are insertable within one of the plurality of apertures, and
   after the fastener has been twisted, the foot cannot be withdrawn from the one of the plurality of apertures, and the tab engages the slot in the one of the plurality of apertures to hold the fastener captive in the one of the plurality of apertures.

* * * * *